United States Patent [19]

Knowles

[11] 4,379,436
[45] Apr. 12, 1983

[54] WATER-TURBULENCE LIGHT-SHIELDING METHOD AND APPARATUS FOR CONFINED-VOLUME FISH GROWTH AND THE LIKE

[75] Inventor: Albert H. Knowles, Concord, N.H.

[73] Assignees: Robert H. Rines; Carol M. Rines, both of Concord, N.H. ; part interest to each

[21] Appl. No.: 294,474

[22] Filed: Aug. 20, 1981

[51] Int. Cl.³ ............................................. A01K 61/00
[52] U.S. Cl. ...................................................... 119/3
[58] Field of Search ........................................ 119/3, 5

[56] References Cited

U.S. PATENT DOCUMENTS 4,211,183  7/1980  Hoult ....................................... 119/3
4,287,852  9/1981  Rines et al. ............................. 119/3

*Primary Examiner*—Hugh R. Chamblee
*Attorney, Agent, or Firm*—Rines and Rines, Shapiro and Shapiro

[57] ABSTRACT

This disclosure is concerned with creating relatively darkened or light-shielded coverings along and upon a substantial selected area of the surface of a pond or other confined fish-holding water volume in the form of surface turbulence generated over said selected area by water spraying or other agitation, with calm illuminated feed zones adjacent but external to said selected area.

9 Claims, 1 Drawing Figure

U.S. Patent    Apr. 12, 1983    4,379,436
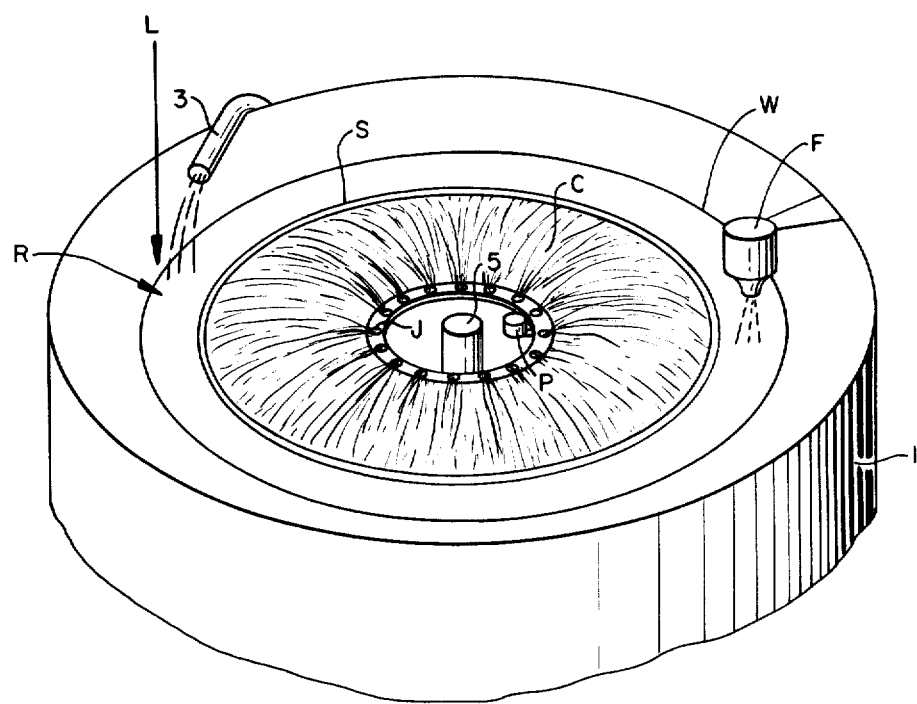

WATER-TURBULENCE LIGHT-SHIELDING METHOD AND APPARATUS FOR CONFINED-VOLUME FISH GROWTH AND THE LIKE

The present invention relates to light-shielding techniques for fish-holding water volumes, being more particularly directed to techniques for producing substantial light-shielded surface areas by rendering selected areas turbulent and thus imparting light-shielding properties thereto insofar as the volume of water immediately thereunder is concerned.

In my prior U.S. Pat. No. 4,271,788, issued June 9, 1981, the accelerated growth rate, increased densities, perfect fish condition absent disfigurement, retarded gonad development, and other advantages of providing a stress-reducing dark volume under a floating opaque cover extending over a substantial portion of the surface of a fish-holding pond or other water-holding volume (as for salmonids and other fish), with illuminated feed zones external thereto, is taught. The stress-relief of the dark volume under the floating cover enables fish like salmon under cover to observe the external lighted feed and partake of the same even over 24 hours with artificial illumination, thus accelerating growth and providing the other mentioned advantages.

There are occasions, such as when very large covers are required, or where rough water-surface conditions are encountered as in the sea, or where other circumstances are encountered, that render it difficult or awkward to employ physical light-opaque covers. It is to the provision of a substitute technique for such conditions and others, though generally less efficacious than physical covers, that the present invention is in large measure directed.

An object of the invention, accordingly, is to provide a novel method of and apparatus for providing light-shielding upon and over substantial delineated surface areas of confined water-volume surfaces that do not require physical light-opaque water-contacting covers, but that effect a degree of light-shielding by generating a surface turbulence covering over specified surface areas and in a manner that permits of adjacent external calm illuminated feed regions.

A further object is to provide a new light-shielding technique of more general utility, as well.

Other and further objects will be explained hereinafter and are delineated in the appended claims. In summary, however, from one of its important aspects, the invention embraces a method of providing at least a partially light-shielded surface area in a confined fish-holding water-circulating volume, that comprises, agitating the surface of said volume over a selected area of predetermined defined shape occupying a substantial portion of said surface to produce turbulence over said selected area that reduces the amount of light entering the volume under said selected area and thereby provides a uniform light-subdued region thereunder; illuminating relatively calm regions external to said selected area; and applying feed to said calm regions while continuing agitation over said selected area. Preferred details and best mode embodiments are hereinafter presented.

The invention will now be described with reference to the accompanying drawing the single FIGURE of which is an isometric view of a preferred embodiment.

In the drawing, a confined or bounded or otherwise predetermined fish-holding pond (pool, tank, cage or other volume) is shown at 1 containing water, circulated therethrough by an inlet pipe 3, and exited through a central standpipe 5 in conventional fashion, the surface of which is designated at W. To provide the before-mentioned at least darkened volume over a substantial portion of the pond for the stress-reducing and resting functions, other than by an opaque physical water-contacting cover, as discussed in said Letters Patent, the present invention generates surface turbulence over a selected area of the surface in a predetermined defined shape (shown as circular and occupying most of the surface area of the pond) which scatters incident light and thereby provides at least a partially effective light-shielded surface area for the water volume underneath the selected area—albeit not as effective a light-blocking covering as a physical opaque water-contacting cover. The turbulence may be generated by a water spray shown generated at an inner circular ring of jets J surrounding the exit pipe 5 (floating or submerged) and fed from, for example, a floating pump P. The jet openings are positioned to insure a total curtain of spraying water commencing from the ring and extending out to the outer periphery or boundaries of the selected area C of circular shape, so that enough points within the selected area C are agitated by water spray drops to produce a continuum distribution of turbulence that generates a light-shielding effect over the complete selected area C and thereunder.

The non-agitated annular water surface regions R adjacent and external to the outer boundaries or periphery of the light-shielding turbulent area C receive illumination L (including artificial light beyond daylight hours, up to 24 hours as desired) and serve as the illuminated feed regions where automatic feeder(s) F periodically apply feed, viewable by the fish as they rest under the turbulent effective light-shielding covering C in the darkened volume thereunder. It is important to inhibit the turbulence from spreading to the relatively calm illuminated feed regions R to provide the sharp physical and light-contrast boundary between the resting volume and the surrounding external illuminated feed zones for the purposes of the accelerated feeding phenomenon and attendant advantages described in said Letters Patent. While a measure of inhibiting the spread of the turbulence can be attained by the jet spray distribution and pump control, a more definite continuous boundary with the calm feed region can be produced by a floating strip or ring S or the like at the desired boundaries of the selected area C. With such a construction, the surface water circulating around the pond after injection at 3 remains continuously relatively calm and enables clear illumination penetration downwward as at L.

The water-spray agitation technique for generating turbulence over the selected surface area C, like an opaque physical cover, also provides protection from sun-burn and bird preditors; and, additionally, has the advantage of aerating the pond water, as well. The shape and size or extent of the covering C may also readily be varied as desired by varying the pressure of pump P or other controls.

Modifications will occur to those skilled in this art including, for example, selected areas C and regions R of different geometries; and, as another illustration, the creating of the turbulence by other than spray means, such as by pressurized air directed over the area C from above to provide the surface agitation; and all such are considered to fall within the spirit and scope of the invention as defined in the appended claims.

What is claimed is:

1. A method of providing at least a partially light-shielded surface area in a confined fish-holding water-circulating volume, that comprises, producing turbulence over a selected area of predetermined defined shape occupying a substantial portion of said surface that reduces the amount of light entering the volume under said selected area and thereby provides a uniform light-subdued region thereunder, by agitating the surface of said volume over said selected area; illuminating relatively calm regions external to said selected area; and applying feed to said calm regions while continuing agitation over said selected area.

2. A method as claimed in claim 1 and in which the spread of the agitating to the calm regions is continuously inhibited.

3. A method as claimed in claim 2 and in which each of said agitating, illuminating and feed applying steps is continued beyond daylight hours.

4. A method as claimed in claim 1 and in which said agitating is effected by spraying upon said selected area in a continuum of turbulence-generating spray distributed thereover.

5. A method as claimed in claim 1 and in which the extent of said agitating is varied to vary the said selected area.

6. Apparatus for providing at least a partially light-shielded surface area in a confined fish-holding water-circulating volume, having in combination with said confined water volume, means for agitating a selected area of the surface of said volume in a predetermined defined shape occupying a substantial portion of said surface to generate an effective light-reducing turbulent covering over said selected area; means for inhibiting the spread of the turbulence to the regions of the surface external to the boundaries of said selected area to maintain the same as relatively calm regions; and means for illuminating feed applied in said calm regions.

7. Apparatus as claimed in claim 6 and in which said agitating means comprises water-spray producing means.

8. Apparatus as claimed in claim 7 and in which said inhibiting means comprises a water-surface-contacting strip about the periphery of said selected area.

9. Apparatus as claimed in claim 6 and in which means is provided for varying the extent of the agitation in order to vary the effective light-reduced selected area.

* * * * *